S. N. GRAGG.
Plantation-Hoe.

No. 222,185.  Patented Dec. 2, 1879.

Witnesses:
Melville Sanford
Wm Chase

Inventor:
Samuel N. Gragg
per Edw. W. Donn
Attorney.

UNITED STATES PATENT OFFICE.

SAMUEL N. GRAGG, OF WAY'S STATION, GEORGIA.

IMPROVEMENT IN PLANTATION-HOES.

Specification forming part of Letters Patent No. 222,185, dated December 2, 1879; application filed October 6, 1879.

*To all whom it may concern:*

Be it known that I, SAMUEL N. GRAGG, of Way's Station, Bryan county, and State of Georgia, have invented a new and useful Improvement in Plantation-Hoes, of which the following is a true and full specification.

This invention relates to that class of hoes for grubbing and rough work, such as are especially used by laborers in the Southern States, heavier than those used in cultivating the common crops at the north, and specially adapted for heavy and coarse work, and called " plantation-hoes."

Hoes are commonly made by welding the shank to the blade, or with an eye forged on the upper edge of the blade, through which the handle is inserted.

The first of these methods secures hardly strength enough for the heavy work intended. The second is clumsy in construction and insecure, as the handle is constantly becoming loose and not secure in the socket.

My method of construction makes a much stronger hoe than the first and much neater and more secure than the second.

Figure 1:
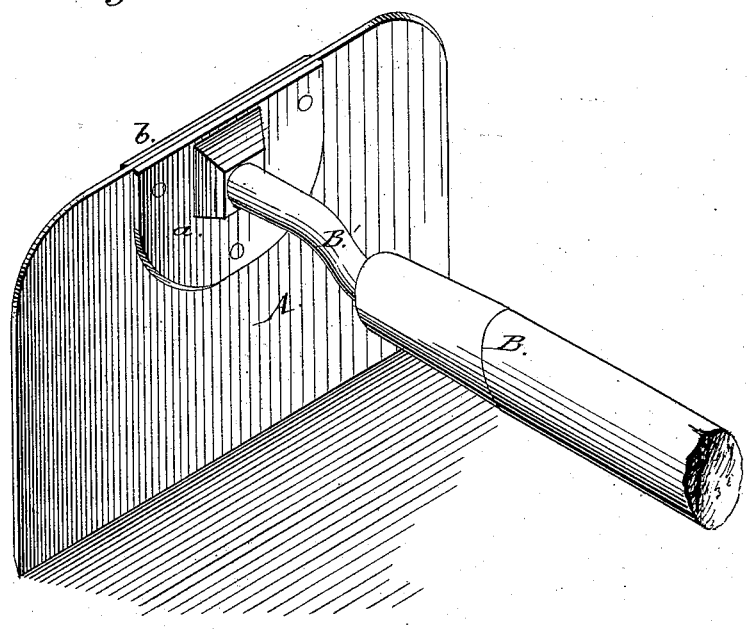
Figure 2:
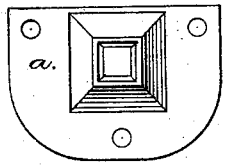
Figure 3:
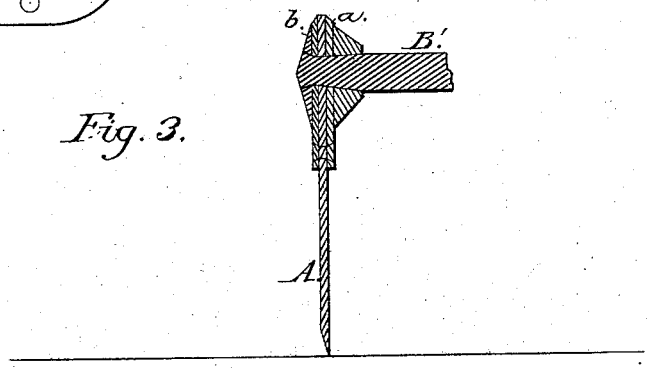

In the drawings, Figure 1 shows a perspective of the hoe. Fig. 2 shows one of the pads, so called. Fig. 3 is a transverse section through hoe.

In the construction of my hoe I stiffen the upper edge of the blade A where the handle B is attached, by two pieces of iron, *a b*, called "pads," one of which is riveted on each side of the blade, covering an extent of about two square inches. These pads, which may be made of either wrought or malleable iron, have projections or are made thicker in the middle. Through this thick and enlarged part is the hole for the shank B' of the handle to enter, passing through both and the blade, and made square to fit the square holes in the pads. These square holes are made a little converging from the outside of each to the blade, and the thickness of the projection or re-enforcement on the pads gives the hoe great strength and stiffness.

The pads being first riveted on the blade, the shank being squared to the size of the inside of both pads where they meet on the blade, and tapered so as to fill the inside pad, and having a slight shoulder to control the depth of its insertion, is, while red-hot, driven through both pads to the shoulder, and projects through the outer pad just far enough to allow its end to be upset and headed down with metal enough to fill the taper of the outside pad. The end of the shank, being red-hot and soft, is by the blows on the end consolidated and upset, so as to fill the holes in the pads. With their slight taper from the outsides to the center, and the end, by the same operation, being solidly headed down into and onto the outside pad, the whole fastening becomes immovable and almost as solid as one piece of metal.

What I claim is—

A hoe constructed with pads having tapering square sockets, and a square shank to fit them, all substantially as shown and described.

SAMUEL N. GRAGG.

Witnesses:
WILLIAM CLIFTON,
JNO. W. WILSON, Sr.